(12) United States Patent
Maddela (10) Patent No.: US 9,477,583 B2
(45) Date of Patent: *Oct. 25, 2016

(54) AUTOMATING FUNCTIONALITY TEST CASES

(71) Applicant: CA, Inc., New York, NY (US)

(72) Inventor: Hari Kiran Maddela, Hyderabad (IN)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,018

(22) Filed: Sep. 19, 2014

(65) Prior Publication Data

US 2015/0007149 A1 Jan. 1, 2015

Related U.S. Application Data

(63) Continuation of application No. 13/204,842, filed on Aug. 8, 2011, now Pat. No. 8,893,087.

(51) Int. Cl.
*G06F 9/44* (2006.01)
*G06F 11/36* (2006.01)

(52) U.S. Cl.
CPC ............ *G06F 11/3684* (2013.01); *G06F 8/70* (2013.01); *G06F 11/3696* (2013.01); *G06F 11/3688* (2013.01)

(58) Field of Classification Search
CPC ........... G06F 11/3684; G06F 11/3688; G06F 11/3696; G06F 8/70
See application file for complete search history.

(56) References Cited

U.S. PATENT DOCUMENTS

| | | | |
|---|---|---|---|
| 3,916,306 A | 10/1975 | Patti | |
| 5,671,351 A * | 9/1997 | Wild et al. | 714/38.13 |
| 6,286,131 B1 * | 9/2001 | Beers | G06F 11/3688 703/22 |
| 6,889,158 B2 | 5/2005 | Penov et al. | |
| 7,010,782 B2 | 3/2006 | Narayan et al. | |
| 7,117,484 B2 | 10/2006 | Hartman et al. | |
| 7,237,231 B2 | 6/2007 | Lambert | |
| 7,437,714 B1 * | 10/2008 | Hahn | G06F 11/3684 717/124 |
| 7,478,365 B2 | 1/2009 | West et al. | |

(Continued)

OTHER PUBLICATIONS

Zhong Jie Li, Jun Zhu et al. "Towards a Practical and Effective Method for Web Services Test Case Generation", [Online], pp. 106-114, [Retrived from Internet on May 15, 2015], <http://ieeexplore.ieee.org/stamp/stamp.jsp?tp=&arnumber=5069048>.*

(Continued)

*Primary Examiner* — Xi D Chen
*Assistant Examiner* — Ziaul A Chowdhury
(74) *Attorney, Agent, or Firm* — Gilliam IP PLLC (57) ABSTRACT

A computer implemented method and system including techniques for developing and executing automated test cases are described herein. In one embodiment, a test case automation tool provides functionality for defining an automated test set and associated test cases within a testing user interface without the use of scripting languages or compiled programming. The definition of each test case may occur within a testing user interface, including displaying and receiving user selection of available methods for testing; displaying user parameter fields and receiving user parameter values in response for testing; abstracting parameter types in the user parameter values; and generating XML-format definitions of the test case. The test case automation tool may then execute the selected methods of the software application using parameters provided in the XML-format definitions, and return testing results of the test case execution.

11 Claims, 9 Drawing Sheets

(56) References Cited

U.S. PATENT DOCUMENTS

| | | | |
|---|---|---|---|
| 7,581,212 B2 | 8/2009 | West et al. | |
| 8,347,267 B2 | 1/2013 | Givoni et al. | |
| 8,352,922 B2* | 1/2013 | Gray-Donald | G06F 11/3696 717/135 |
| 8,683,446 B2* | 3/2014 | Paradkar | G06F 11/3684 717/126 |
| 8,799,714 B1* | 8/2014 | Guruswamy | G06F 11/3684 714/25 |
| 9,021,448 B1* | 4/2015 | Gagliardi | G06F 8/70 717/128 |
| 9,213,622 B1* | 12/2015 | Morgan | G06F 11/3636 |
| 2003/0018932 A1* | 1/2003 | Blum et al. | 714/46 |
| 2003/0140138 A1* | 7/2003 | Dygon | G06F 11/3688 709/224 |
| 2003/0204784 A1 | 10/2003 | Jorapur | |
| 2004/0107415 A1 | 6/2004 | Melamed et al. | |
| 2005/0188271 A1 | 8/2005 | West et al. | |
| 2005/0268285 A1* | 12/2005 | Bagley et al. | 717/124 |
| 2006/0085132 A1 | 4/2006 | Sharma et al. | |
| 2007/0174713 A1* | 7/2007 | Rossi et al. | 714/38 |
| 2007/0240116 A1* | 10/2007 | Bangel et al. | 717/124 |
| 2007/0277154 A1* | 11/2007 | Badwe | 717/124 |
| 2008/0059558 A1* | 3/2008 | Singh | G06F 17/3089 709/202 |
| 2008/0178154 A1* | 7/2008 | Basler et al. | 717/124 |
| 2008/0244524 A1 | 10/2008 | Kelso | |
| 2009/0006897 A1* | 1/2009 | Sarsfield | G06F 11/3684 714/38.14 |
| 2009/0089039 A1* | 4/2009 | Shufer | G06F 11/3696 703/23 |
| 2009/0254887 A1* | 10/2009 | Rossi et al. | 717/126 |
| 2009/0271351 A1 | 10/2009 | Kandasamy et al. | |
| 2009/0319832 A1* | 12/2009 | Zhang | G06F 11/3684 714/38.1 |
| 2009/0320002 A1* | 12/2009 | Peri-Glass | G06F 11/3688 717/131 |
| 2010/0100872 A1 | 4/2010 | Mitra | |
| 2010/0198799 A1* | 8/2010 | Krishnan | G06F 11/3696 707/702 |
| 2011/0202901 A1 | 8/2011 | Givoni et al. | |
| 2011/0239194 A1* | 9/2011 | Braude | G06F 11/3688 717/124 |
| 2011/0258609 A1 | 10/2011 | Maczuba | |
| 2011/0307860 A1* | 12/2011 | Park | G06F 8/30 717/107 |
| 2012/0011487 A1 | 1/2012 | Matsumoto | |
| 2012/0089964 A1 | 4/2012 | Sawano et al. | |
| 2012/0159448 A1 | 6/2012 | Arcese et al. | |
| 2013/0007519 A1* | 1/2013 | Kristoffersen | G06F 11/3696 714/27 |
| 2013/0042222 A1 | 2/2013 | Maddela | |
| 2013/0086558 A1* | 4/2013 | Merino | G06F 11/3688 717/128 |

OTHER PUBLICATIONS

Xiaoying Bai et al., "WSDL-Based Automatic Test Case Generation for Web Services Testing", [Online], IEEE2005, pp. 1-6, [Retrieved from Internet on Jun. 10, 2016], <http://ieeexplore.ieee.org/stamp/stamp.jsp?tp=&arnumber=1551150>.*

Kevin M. Conroy et al., "Automatic Test Generation From GUI-Based Applications for Testing Web Services", [Online], IEEE 2007, pp. 345-354, [Retrieved from Internet on Jun. 10, 2016], <http://ieeexplore.ieee.org/stamp/stamp.jsp?tp=&arnumber=4362647>.*

Tien-Dung Cao et al., "Testing of Web services: Tools and Experiments", [Online], IEEE2011, pp. 78-85, {Retrieved from Internet on Jun. 10, 2016], <http://ieeexplore.ieee.org/stamp/stamp.jsp?tp=&arnumber=6127946>.*

Giovanni Denaro et al., "Adaptive Integration of ThirdParty Web Services", {Online], ACM 2005, pp. 1-6, [Retrieved from Interent on Jun. 10, 2016], <http://delivery.acm.org/10.1145/1090000/1083088/p20-denaro.pdf>.*

"U.S. Appl. No. 13/204,842, Examiner Interview Summary mailed Feb. 20, 2014", 4 pgs.

"U.S. Appl. No. 13/204,842, Final Office Action mailed May 7, 2014", 25 pgs.

"U.S. Appl. No. 13/204,842, Non Final Office Action mailed Oct. 18, 2013", 21 pgs.

"U.S. Appl. No. 13/204,842, Notice of Allowance mailed Jul. 18, 2014", 9 pgs.

"U.S. Appl. No. 13/204,842, Response filed Feb. 18, 2014 to Non Final Office Action mailed Oct. 18, 2013", 12 pgs.

"U.S. Appl. No. 13/204,842, Response filed Jul. 7, 2014 to Final Office Action mailed May 7, 2014", 10 pgs.

"HP Business Process Testing software: test automation focused on your business White paper", (Apr. 2007), 12 pgs.

"HP QuickTest Professional software Data sheet", (May 2007), 4 pgs.

"Mercury QuickTest Professional Tutorial Version 8.0", (2004), 111 pgs.

"SilkPerformer Java Explorer 2010 User Guide", (Mar. 2010), 110 pgs.

"SilkPerformer Java Framework 2009 R2 Developer Guide", (Nov. 2009), 54 pgs.

Bai, Xiaoying, et al., "WSDL-Based Automatic Test Base Generation for Web Services Testing", Proceedings of the 2005 IEEE International Workshop on Service-Oriented System Engineering (SOSE'05), (2005), 6 pgs.

Elaine, Weyuker J, et al., "Experience with Performance Testing of Software Systems: Issues, an Approach, and Case Study", IEEE, [Online]. Retrieved from Internet: <http://www.computer.Org/csdl/trans/ts/2000/12/e1147.pdf>, (2000), 1147-1156.

Mary, Jean Harrold, "Testing: A Roadmap", ACM, [Online]. Retrieved from Internet: <https://www.cs.drexel.edu/~jhk39/teaching/cs576su07/week1 Readings/harrold.pdf>, (2000).

Sandra, Rapps, et al., "Selecting Software Test Data Using Data Flow Information", [Online]. Retrieved from Internet: <http://ieeexplore.ieee.org/stamp/stamp.jsp?tp=&arnumber=1702019>, (1985), 367-375.

Sreedevi, Sampath, et al., "Prioritizing User-session-based Test Cases for Web Applications Testing", [Online]. Retrieved from Internet: <http://ieeexplore.ieee.org/stamp/stamp.jsp?tp=&arnumber=4539541>, (2008), 141-150.

* cited by examiner

☐ Test Case Details

Select Test Case: [Pre-Requisites ▼] ~710

List of Required Java Files:

712 —
CoacSD
DBMapWrapper
DateFunctions
GenericMethods
ListResult
STAFCalls
StringFunctions
USD_WebServiceSoapSoapBindingStub
XMLParserMethods Method Name    ---   Log Message    ---   Expected Result getSystemEnvValue() -- "Local Machine Temp location: "~temp -- PASS
FileRead() -- "SDM server name: "~sdserver -- PASS
FileRead() -- "SDM server port number: "~sdport -- PASS
FileRead() -- "SDM login user name: "~sduser -- PASS
FileRead() -- "SDM login password: "~sdpwd -- PASS
getWorkingDirectory() -- "Current Working Directory: "~workdir -- PASS
getLocalHostName() -- "QC Local Machine Name: "~qcmachinename -- PASS 714   716   718   720

FIG. 7

SDM Data Generator

Test Set Name: DataGenerator     [Add Row] — 802

| Select | Sno. | TestCase Name | Depend On TC | ExpTransactions | Completed |
|---|---|---|---|---|---|
| ☑ | 1 | Pre-Requisites | 0 | 1 | 1 |
| ☑ | 2 | TC_CreateRequest | 1 | 100 | 12 |
| ☐ | 3 | TC_CreateProblems | 1 | 100 | 0 |
| ☐ | 4 | TC_CreateIncident | 1 | 100 | 0 |
| ☑ | 5 | TC_CreateChangeOrders | 1 | 100 | 12 |
| ☐ | 6 | tc3 | 1 | 100 | 0 |
| ☐ | 7 | Attachments | 1 | 100 | 0 |
| ☐ | 8 | pre_chgcat | 1 | 100 | 0 |
| ☐ | 9 | chgcat | 1 | 100 | 0 |
| ☐ | 10 | CR_CreateAttachment | 1 | 100 | 0 |
| ☐ | 11 | CR_DoSelet | 1 | 100 | 0 |
| ☐ | 12 | TCcreateAsset | 1 | 100 | 0 |
| ☐ | 13 | TC_CreateAnnouncement | 1 | 100 | 0 |
| ☐ | 14 | TC_CreateLocations | 1 | 100 | 0 |
| ☐ | 15 | temp | 1 | 100 | 0 |
| ☐ | 16 | tc1 | 1 | 100 | 0 |
| ☐ | 17 | TC_CreateDocument | 1 | 100 | 0 |
| ☐ | 18 | TC_CreateDocument2 | 1 | 100 | 0 |
| ☐ | 19 | TC_GetkDCategoryIDs | 1 | 100 | 0 |
| ☐ | 20 | TC_CreateContact | 1 | 100 | 0 |

Total execution time (H:M:S): 0 : 0 : 0     [Execute]   [View Log]

AUTOMATING FUNCTIONALITY TEST CASES

PRIORITY APPLICATIONS

This application is a continuation of and claims the benefit of priority to U.S. patent application Ser. No. 13/204,842, filed on 8 Aug. 2011; which application is incorporated herein by reference in its entirety.

BACKGROUND

Various commercial and open-source tools exist to assist with the automation of test cases for software testing, and to generally perform testing for website user interfaces, web services, command line utilities, and common language interface (CLI) applications. Many of these automation tools generate code in a specific scripting language in order to automate execution of the test cases. Apart from the fact that this code (and the underlying test scripts) requires a specific skill set and expertise to develop, the use of scripting language also makes the modification and debugging of automation code difficult.

The automation of test cases requires developing a comprehensive approach to test all of the functional areas that the software is deployed on. This may involve test cases invoked on duplicative frameworks to fully test software applications with existing tools. For example, one test case may be required to test a functional area such as a website user interface, whereas a separate test case may be required to automate CLI test case scenarios used in connection with the website. Likewise, if a user wants to implement testing of a Java® application and a web service running components of this Java application, the user will have to build separate components to consume each of the Java applications and the web service. Moreover, existing test automation programs involve high costs, lengthy turn-around time, user expertise in scripting or programming languages, and high maintenance requirements that increase with the number of test cases.

SUMMARY

Computer-implemented systems and methods for defining and executing automated test cases are described herein. In one embodiment, a computer-implemented method for establishing an automated test case includes enabling user definition of an automated test case with a testing user interface, executing the automated test case, and providing execution results from the automated test case. The user interface may receive user selection and specification of one or more methods and parameter values for automated test execution of the one or more methods. The automated test case may then be generated and stored with use of an Extensible Markup Language (XML) format definition that specifies the method, the parameter values, and other details of the test case.

In another embodiment, a non-transitory machine readable storage medium provides instructions to cause a computer to provide a testing user interface enabling user definition of an automated test case, generate an XML-format definition of the automated test case, execute the automated test case, and provide execution results from the automated test case, in accordance with the various techniques described herein. In a further embodiment, the instructions may also cause the computer to display the results of test case execution in one of various formats in the testing user interface.

In still another embodiment, a computing system configured for automated test case definition and execution includes a test case automation tool module and a graphical user interface module. The test case automation tool module provides a test case automation tool operable for generating XML-format definition of an automated test case, executing the automated test case using the XML-format definition, and providing results from the execution of the automated test case. The graphical user interface module provides a graphical user interface for displaying a listing of available software applications for testing, receiving user selection of the method for testing execution, and receiving parameter values for use in testing execution of the method.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other types of storage devices. Further, such functions correspond to modules, which are software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The presently disclosed embodiments provide a series of techniques and tools that enable automation of test cases for a software application across a plurality of deployment frameworks (e.g., for any combination of graphical or website user interfaces, web services, and command line-executed java applications) for developed software applications or components, without writing code or script. These techniques may be exposed through a testing user interface that provides an intuitive and non-script based platform to promote the development and modification of automated test cases. This user interface and the associated test development techniques described herein may reduce the cost and effort involved in automating and maintaining a variety of test cases.

As explained below, the presently disclosed embodiments may overcome many of the challenges involved in using existing testing tools. These include the high cost and effort for the development and maintenance of automated test cases and test suites. For example, in the QA (quality assurance) life cycle of a software project, the time needed to generate a full set of test cases is quite high when compared with the time needed to develop the software framework itself. Also, future modifications to test cases in existing tools often implicates overhead from compilation time or tool dependency.

Full-scale testing of software applications may further involve a significantly high overhead with existing testing approaches. For example, in the case of automating the testing of certain enterprise applications, the software application may have thousands of automated test cases to be developed and maintained. Maintaining the appropriate test cases and tests with existing test automation tools requires user knowledge of scripting or programming languages that run the underlying test scripts.

The automation of functionality test cases generally occurs in a two-step process: 1) Developing a comprehensive framework using Java, .NET, or another programming language; and 2) Building test cases using the developed framework. Thus, as the user identifies any functional area (for example, website user interfaces (Web UI)), the test user needs to develop the testing framework to automate Web UI test case scenarios. If the area identified is CLI, the test user needs to build a framework to automate CLI test case scenarios. If the user would like to consume Java applications, the test user needs to build the framework/components with respect to functionality. Finally, the test user will have to start writing test case automation scripts by invoking methods from the developed framework/component. This approach involves cost, turn-around time, expertise in Java/.NET or the specific programming language, and high maintenance dependent on the number of test cases.

The limited amount of automation and test case simplification provided through existing automation testing graphical user interfaces and frameworks is generally focused and limited to one specific area (i.e., only to Web UI, web services, or CLI). Often, a user needs a combination of areas to be handled by a single test case or test set in order to fully test a software application used in each of these areas, such as a compiled Java component. Currently, there is no approach that enables testing users to automate test cases across multiple deployment platforms and frameworks without writing specialized code or operating multiple testing tools.

Other challenges from existing automated test programs include a lack of integration with third party or test case management tools. This requires the installation and separate use of additional testing tools, or special configurations in connection with test scripting and test scripting languages. Modifications to the test cases may also be difficult, even for a relatively simple step of testing the results of executing a new method added to a Java program. Further, there may be a variety of challenges with internationalization (I18N) and localization (L10N) testing due to the reliance on test scripts and test scripting language. These challenges provide a non-exhaustive sampling of some of the issues with automation test tools, despite the high cost of automated test scripting.

The following describes various designs of test case automation tools and interfaces that provide a test user with the ability to automate a plurality of functional test cases in a graphical user interface (GUI) without writing or generating code and scripting languages. In one embodiment, a test case automation tool is configured to directly consume the various software libraries and components to be tested, such as compiled Java classes, and accept a software application directly as input into a test scenario.

Further, the test case automation tool may similarly consume software application methods, such as wrapper Application Programming Interfaces (APIs), from well-known third party testing tools to perform the various automated testing actions. Likewise the test case automation tool may consume web services and create APIs to execute methods in such web services. The test case automation tool can then simplify test case development to the selection and execution of a series of known methods. Thus, varied actions such as website user interface testing, graphical user interface testing, and web services testing can be developed and executed using the same techniques as for the testing of a Java command line application.

As further discussed below, the test case automation tool may be operated by a test user to define specific inputs and testing actions to establish an automated test case and test set collection of test cases. The test case automation tool is further able to execute an automation of test scenarios and use cases of various methods from libraries and components imported into the test case development tool without writing or generating any automation code or script. Providing this unified approach to all types of testing enables testing users to develop great familiarity with the test case automation tool and its associated features.

The following disclosure emphasizes the approach that a testing user need not write a single line of code to perform testing meeting all QA requirements, although the tool to implement this approach may vary significantly. Specifically, the following discussed test case automation tool is a provided as one example that can be modified and adapted to testing requirements and needs. It will be recognized that the test case automation tool may be designed and implemented using any suitable technology such as Java or .NET.

In one embodiment, the presently described test case automation tool may be provided through use of a GUI designed to simplify the automation of test cases. The GUI may integrate with existing testing tool interfaces through any number of direct or indirect techniques. For example, in connection with the testing of Java applications, application GUIs, an automation framework, and other integrated tools may provide the ability to test Java class methods separately or in combination with one or more deployed web services or software applications.

The GUI may accept commands to allow the specification of inputs to the application, initiate test actions on the application, define expected results of the test actions, and verify or report the results of the test action. It will be recognized that such a test case automation tool may be provided and operated as a command line utility, a standalone GUI application, a website, or with other interface techniques; however, for purposes of illustration of the various capabilities and features, a GUI to the test case automation tool is described in the following sections in detail.

Figure 1:
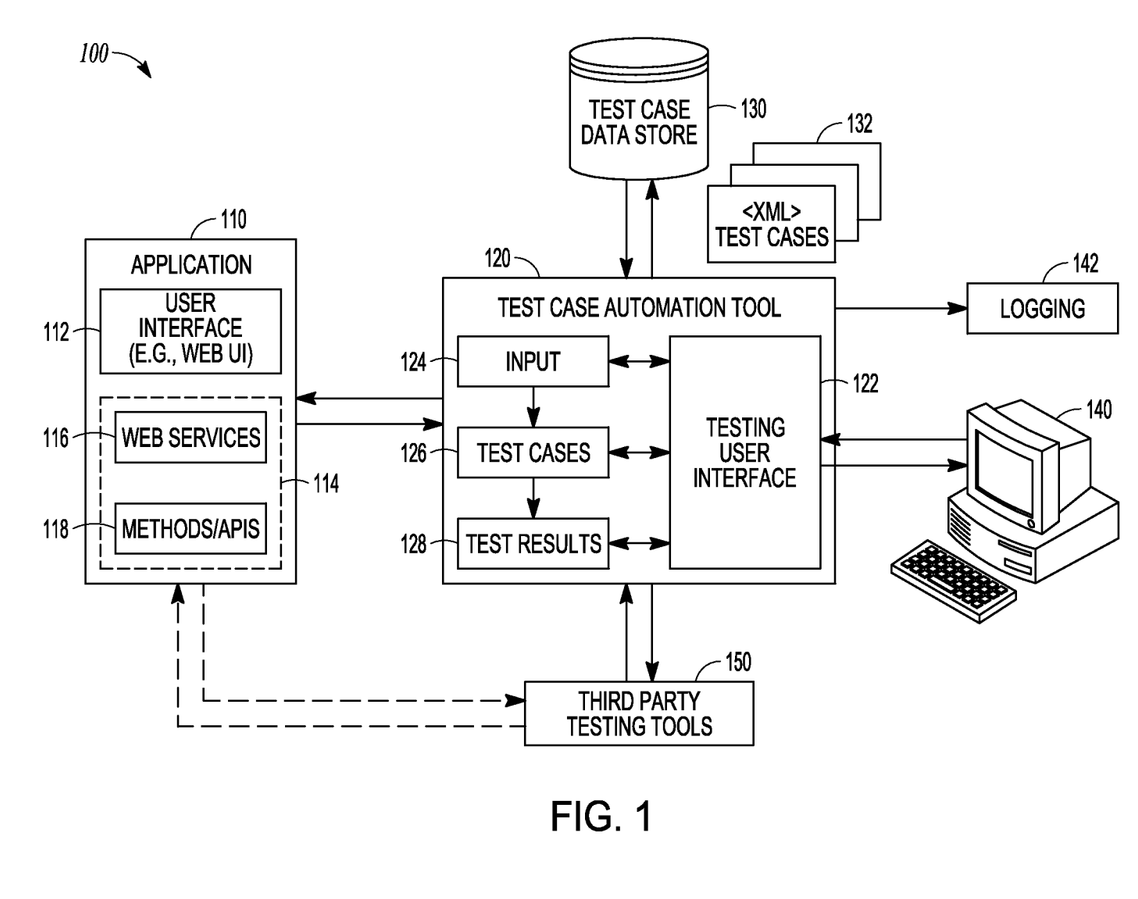
FIG. 1 is a block diagram illustrating example interactions between a test case automation tool and a target software application, according to an example embodiment.

FIG. 1 provides a block diagram illustration of a graphical automated testing framework 100 for producing automated test cases without scripting languages, for the testing of software application 110 in connection with the interactive features of a test case automation tool 120. As shown, software application 110 may include a variety of features including a user interface 112 and components 114, such as web services 116 and methods or APIs 118 (e.g., Java methods exposed in the compiled software application).

The test case automation tool 120 is configured to communicate with the software application 110 during the testing of the specific application interfaces and components, such as user interface 112, web services 116, and methods or APIs 118. The test case automation tool 120 may be configured to provide a unified location for the creation, maintenance, and execution of automated test cases, and be exposed to a test user through a testing user interface 122. For example, test case automation tool 120 functionality may be provided by interfaces, data, and various test development and execution techniques provided through a collection of input 124 for the test cases, the automation of a set of defined test cases 126, and various production and reporting features in connection with test results 128.

The test case automation tool 120 may be configured for storing and retrieving test cases and associated test case data in a data store 130. In one embodiment, automated test cases and data associated with the automated test cases are maintained through a series of XML test case definitions 132 that are stored and communicated between the data store 130 and the test case automation tool 120. Specifically, the test case automation tool 120 may create and consume automated test cases 126 in an XML format provided by the XML test case definitions 132. Creation of the test cases in an XML format rather than with the use of scripting language provides the ability for subsequent modification and use of the test cases and test sets without compilation or specialized scripting/programming knowledge.

Related test cases may be generated in one or more test sets or other like groupings. In one embodiment, test sets are structured as XML files to contain the test case definitions 132 for a series of test cases. For example, an XML file may be generated when a new test set is created. Each XML file name may start with the test set name defined in the testing user interface 122 for simplicity, and provide the series of test cases in XML format with appropriate XML fields and data throughout the XML file of the test set.

The test case automation tool 120 may provide various interfaces in a connection with the creation and execution of an automated test, such as through use of a testing user interface 122 that is exposed to testing users and administrators. The test case automation tool 120 may therefore provide an intuitive way to automate test cases through a single testing user interface 122 without requiring specialized code from a testing user, and while using frameworks and functionality from existing third party tools and utilities.

For example, the test case automation tool 120 may provide the testing user interface 122 for access by a plurality of authorized remote testing users at testing system 140, such as through standalone software application running on the testing system 140. A testing user may receive further information regarding the status of the test results and operations through logging 142 or like alerts and debugging messages.

Third party testing tools 150 may be integrated directly into operations designed and executed by the test case automation tool 120. Specifically the test case automation tool 120 may provide a series of method calls and operating instructions to configure and control the third party testing tools 150 during design and execution of an automated test case. Alternatively, the test case automation tool 120 may provide its own custom functionality, logic, and custom methods to design and execute the various testing actions upon the software application 110 without use of third party testing tools 150. For purposes of simplicity but not limitation, a variety of well-known third party testing tools that may be employed by the test case automation tool 120 are described in the following text and drawing.

Figure 2:
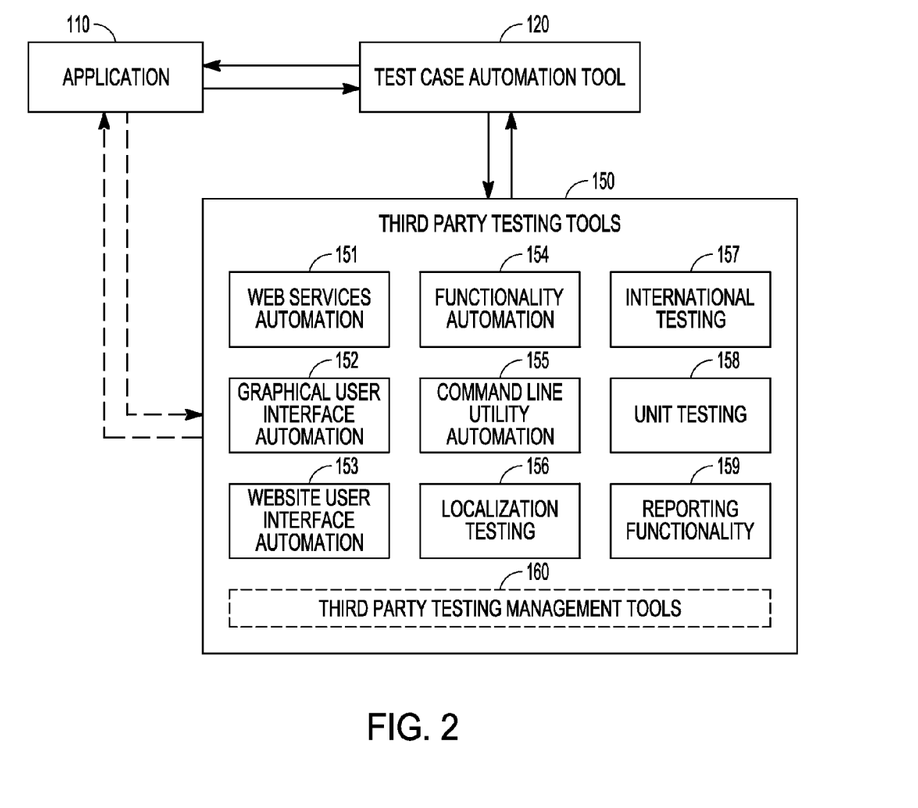
FIG. 2 is a block diagram illustrating example interactions between a test case automation tool, a target software application, and a plurality of third party testing tools, according to an example embodiment.

FIG. 2 provides an illustration of the integration of the test case automation tool 120 with a set of external utilities and third party testing tools 150. As an example of the use of third party testing tools 150 in a further embodiment, the test case automation tool 120 may integrate with various tools to provide: Web Services Automation 151 using Java tools; Graphical User Interface Automation 152; Website User Interface Automation 153 using WATIJ API; Functionality Automation 154 using STAF API and WATIJ API; Command Line Utility Automation 155 using STAF API; Localization Testing 156; Internationalization and International Requirements Testing 157; Unit Testing 158 using a variety of Java APIs; and Reporting Functionality 159.

Integration with third party tools may be directly provided in functions and actions of the test case automation tool 120. Optionally, integration between the test case automation tool 120 and the third party testing tools 150 may result in a direct action from the third party testing tools 150 to the software application 110, such as when testing results data is collected from the activities of the third party testing tools 150 and communicated to the test case automation tool 120 after execution of the test cases and other test activities.

The test case automation tool 120 may also provide integration with third party testing suites or management tools 160 such as Mercury Quality Center. Likewise, the test case automation tool 120 may be designed to provide output (such as in test results 128) in a standardized format to be read by any of the specific third party testing tools 150 or specifically the aforementioned testing suites and management tools 160.

Figure 3:
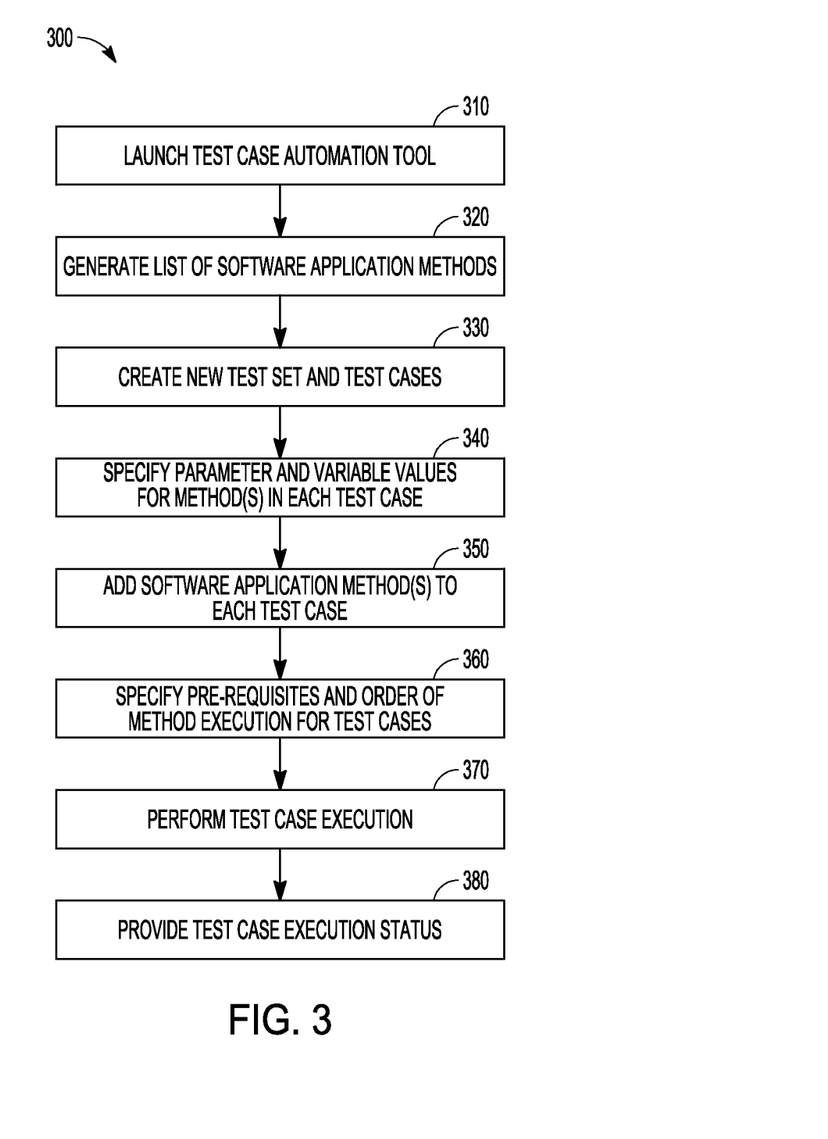
FIG. 3 is a diagram illustrating a flowchart for creating and executing test cases in a test case automation tool, according to an example embodiment.

FIG. 3 provides a flowchart detailing one example process 300 for developing a set of test cases in a test set using a test case automation tool, according to one embodiment. As illustrated, the test case automation tool is launched 310 to provide an interface for developing and executing one or more automated test cases (and one or more test sets) upon a software application. The software application may be tested with a series of software application method calls, third party application method calls, and testing actions directly from the test case automation tool or one or more external testing tools.

The test case automation tool may generate a list of relevant software application methods 320 and provide this list for selection by a testing user. In one embodiment, the list of relevant methods used in testing is extracted from the software application and third party testing applications and stored in an XML file accessible to the test case automation tool and the test case automation tool interface. The testing user may then select a combination of the software application methods for execution in the test case, in addition to invoking testing methods (such as methods to interface with user interfaces) from various testing utilities as appropriate.

A test set and test cases may be created or modified to perform testing of software application methods 330 for use in an automated test scenario with the test case automation tools. Creation of the test cases and the test set may be automatically provided by actions of the test case automation tool, or each test set and test case may be manually specified by a testing user. The test cases may be individually specified through the use of a wizard, navigable interface, selection interface, or through other computer-aided directions.

Parameter and variable values may be specified or modified for the various methods of each test case 340. The parameter values provided to test the software application methods may comprise a static string or a type variable. The test case automation tool may be configured to internally handle the type casting mechanism for the given parameters. The parameter values may also be specified as a static string concatenated with variable(s).

Each software application method to be tested may be added to an appropriate test case 350 with use of the test case automation tool. In one embodiment, the details for all test cases are stored in XML format in an XML file associated with the test set. Again, the addition of the software application method to the test case and the test set XML file may occur automatically by the test case automation tool, or each method may be manually added and specified by a testing user in an interface.

The testing user may specify or modify the order of method execution and any prerequisites for test case execution 360. For example, the test case automation tool may enable a provision for invoking already designed test case(s) within another test case of the same test set. Likewise, the execution of a method of a test case may be dependent on the results of the execution of another method or test case.

Once the test cases and test set are properly configured, the test case execution may be performed 370. The test case automation tool provides an automated execution of the test cases according to the various conditions defined in the various test cases and the test set. For example, the test case automation tool may read the XML definitions of the test case and perform activities based on the sequence and data provided in the XML file instead of using detailed scripting instructions. Errors and unexpected results that occur during execution of the test case may be logged or captured for further analysis.

Upon completion of the test case execution, the test case execution status for individual methods, test cases, or the test set as a whole may be provided 380 to a testing user, automated process, or other location. This may include presenting a detailed or summarized log of test case execution activities; a listing of pass/fail test case results; graphical indications; or alerts provided to a testing user.

Figure 4:
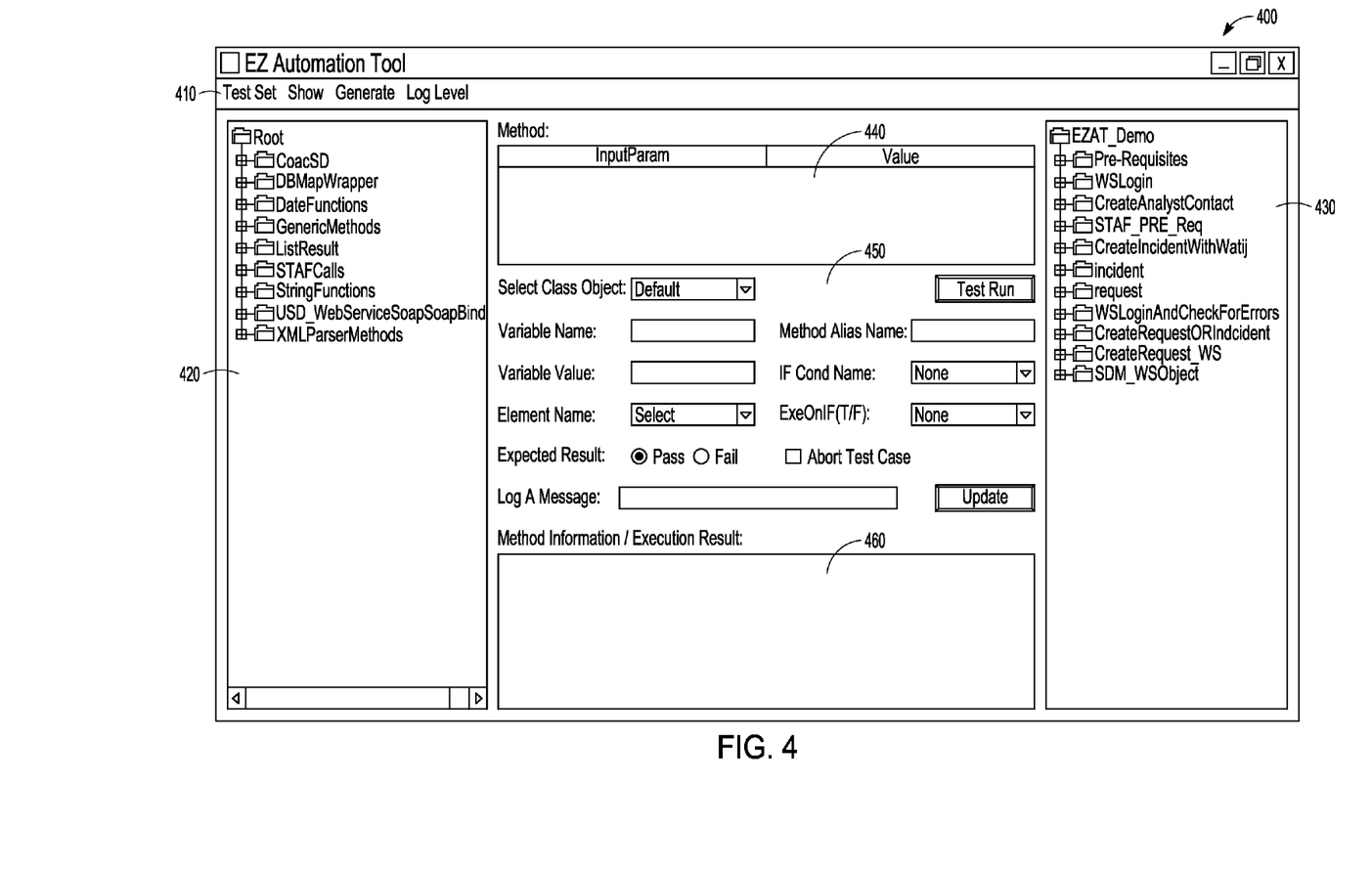
FIG. 4 is an illustration of a graphical user interface for creating a test case in a test case automation tool, according to an example embodiment.

FIG. 4 provides a screenshot of a GUI 400 illustrating one example embodiment of a test case automation tool, and configured to perform the previously described techniques of FIG. 3. As depicted, the GUI 400 provides an easy way to automate test cases and perform test execution of various software application methods through a single window without writing code.

The test case automation tool may be further integrated to use methods from existing frameworks and third party testing tools (such as STAF, WatiN, and Selenium wrapper APIs) while providing a custom GUI. The GUI and the test case automation tool may itself be developed as a Java application for deployment on a variety of hardware and software platforms; however, a variety of other programming languages (such as .NET, C++, and the like) may be used to design and implement the GUI and test case automation tool.

The GUI 400 may be configured to enable a testing user to create and modify automated tests for a variety of software application frameworks. Further, the illustrated GUI 400 provides a series of interface techniques designed to make it easy to add and invoke new methods of a software application for testing. The interface may specify various provisions for editing and invoking already designed test case(s) within another test case of the same test set as appropriate.

As illustrated in FIG. 4, the GUI 400 may expose the functionality of the presently described test case automation tool with a variety of input fields and selectable options. The GUI 400 may specifically provide menus or other selectable interfaces such as menu 410 enabling selection and manipulation of test sets, test case generation, testing logging, and various other selections and options within the interface menu 410.

For example, interface menu 410 may provide a "Generate" menu with functionality to generate backups of test sets and test cases; generate web service stubs; and add and remove software applications for testing. Interface menu 410 may also provide options for specifying a logging level. For example, an 'INFO' logging level may be configured to only log method execution statuses with PASS/FAIL and any error statements occurring during execution; whereas, a 'DEBUG' logging level may log additional automated actions to review causes of encountered problems.

The method list 420 provides a tree structure that presents a selectable list of methods from software application methods, both from the software application to be tested, and from third party testing applications. For example, FIG. 4 illustrates the inclusion of Java testing methods such as USD_WebServiceSoapSoapBindingStub, ListResult, GenericMethods, DBMapWrapper, DateFunctions, StringFunctions, XMLParserMethods, STAFCalls, and the like loaded from a specified directory. A custom software application with custom classes and methods may be added to this directory for selection and testing.

The test case list 430 provides a tree structure that presents a list of test cases under a test set. The test cases may be arranged into a hierarchy and reordered in the test case list. Multiple test sets may also be provided in the test case list 430, although for simplicity only one test set, "EZAT_Demo," is illustrated in the test case list 430 of FIG. 4, with test cases such as "Pre-Requisites," "WSLogin," and the like.

Clicking on any method in the method list 420 will display the method name, return type, and input parameter names for the method in a table 440. Selecting the method further resets all controls for the method test input fields 450, such as text fields, dropdowns, checkboxes, and radio buttons, with default values. Within the method test input fields 450, a testing user can specify appropriate parameters and automated execution of the method.

For example, a testing user may specify input parameters for the software application method, including input parameter values, conditions of method execution, expected results of method execution, and custom actions occurring upon execution of the method in test case. The testing user may also be provided with the ability to test the proposed test parameters in a test run, displayed in an execution result window 460.

The execution of the method and the values for the parameters of the method may be tied to the execution of other methods in the test case, or results of other test cases. Further, variables may be created to extend across multiple test cases in a test case.

In a further embodiment, the test case automation tool interface may provide a variable listing which shows information about the already declared and used variables of each test set. The list of test sets may be selected from a drop down list, or the list of variables may be otherwise shown upon selecting any particular test set. Variables can also be renamed, added, and removed in connection with the variable listing.

Figure 5:
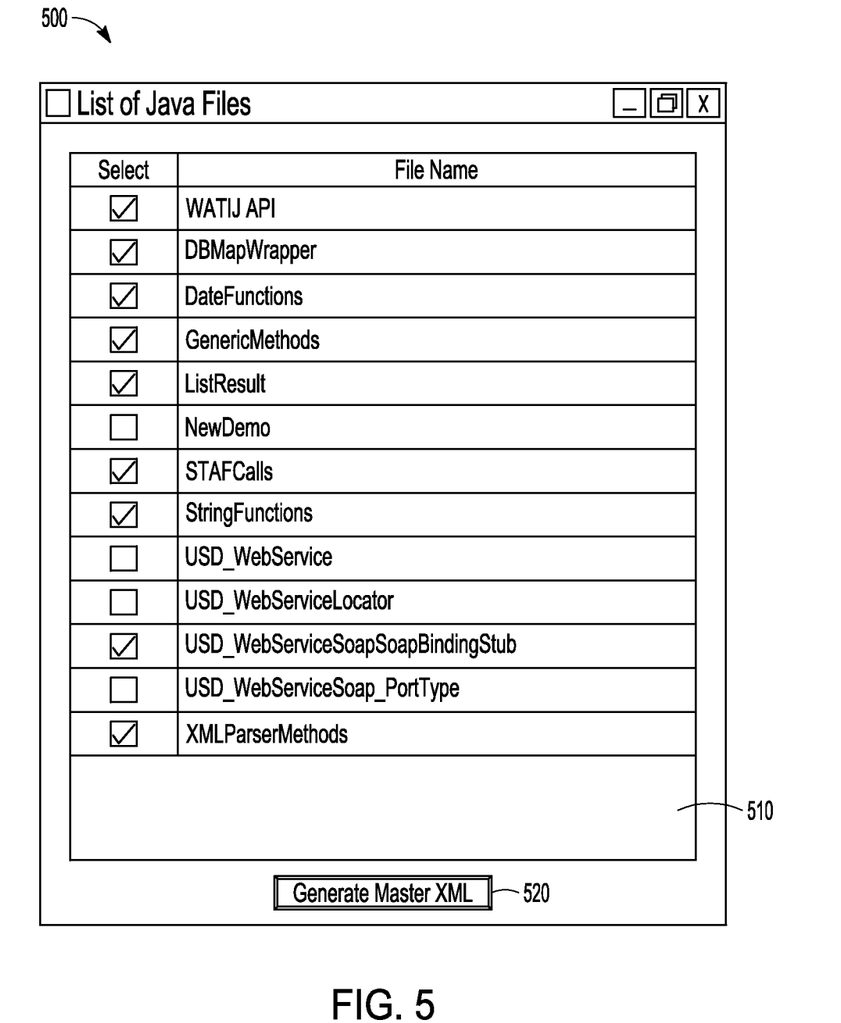
FIG. 5 is an illustration of a graphical user interface for accessing software application methods for testing in a test case automation tool, according to an example embodiment.

FIG. 5 provides a screenshot of a GUI 500 providing an illustration of a selectable listing of software applications available for testing in one example embodiment. As illustrated, a listing of software applications, specifically Java files 510, is provided in a selectable listing as input for execution in a test set within the test case automation tool. This listing of software applications may include a combination of both software applications to be tested and software applications having methods to perform testing actions. The software application listing is accompanied by a selectable command 520 to generate XML that provides method details for all of the selected software applications.

The test case automation tool may generate information on the various methods into an XML format and one or more XML files to provide a fast way for the automation tool interface to retrieve and access software application method information at subsequent times. For example, this XML may be re-populated into method list 420 of FIG. 4. Thus, XML for software applications used in an entire test set may be provided in a master file to hold the information from each of the methods, and additional information on the methods may be added or changed as instructed to the test case automation tool.

Automated test cases for the test sets themselves may also be stored in an XML format, although such test case data may also be maintained in other formats in a database or other data store. The GUI 400 of FIG. 4 may be configured to load this XML data from a selected test set or from various test cases, thereby providing easy maintenance and changes to the automated test cases at future times. For example, the test case list 430 in FIG. 4 may be re-populated from such test case XML data.

The GUI may also provide a variety of graphical and textual indications of the execution results from the test cases, including providing a listing with PASS/FAIL status. Further, various levels of logging information may be established and turned off based on the specific test case, test set, or preference settings. Additionally, the test case management tool may factor error codes programmed into the software application or the test case automation tool for custom error reporting and logging.

Figure 6:
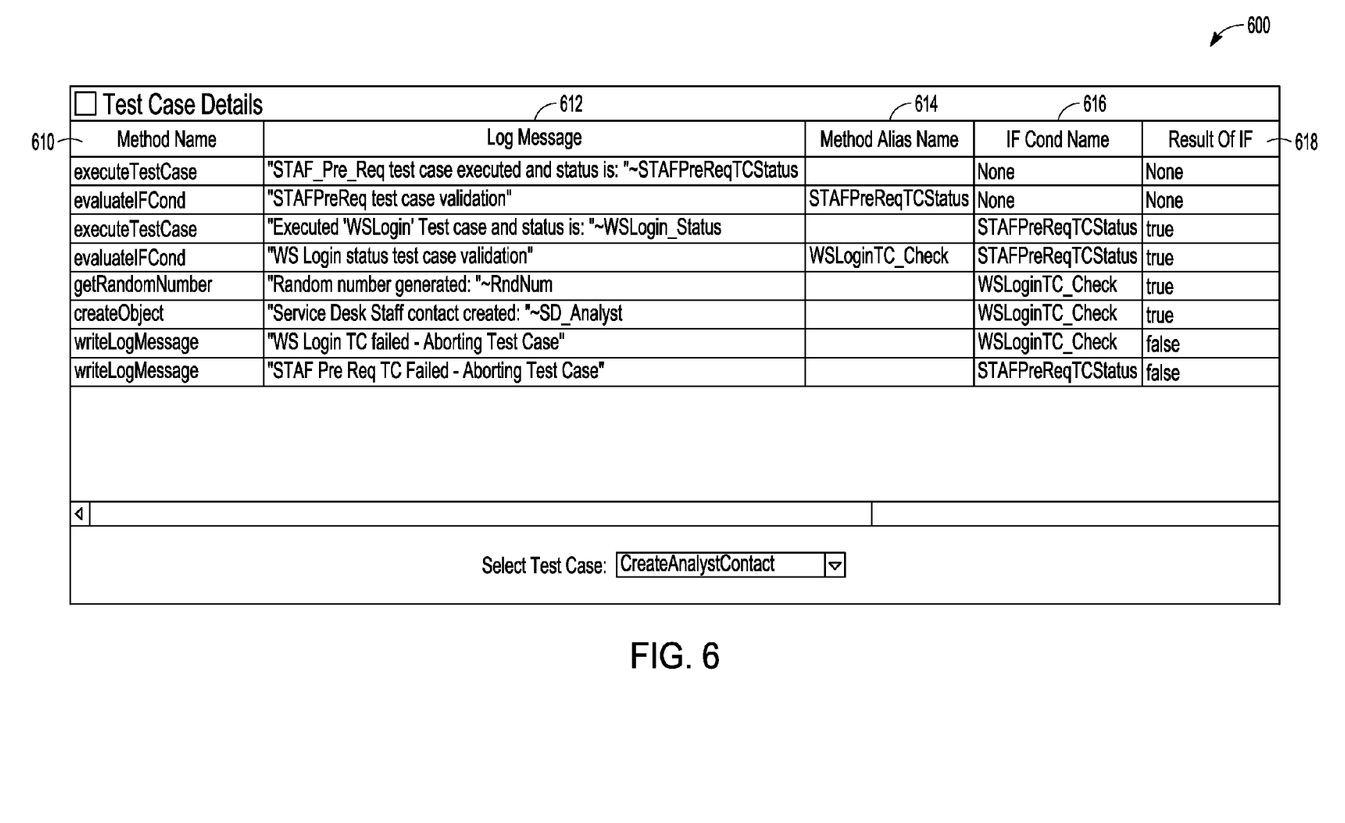
FIG. 6 is an illustration of a graphical user interface for reviewing test case specifications in a test case automation tool, according to an example embodiment.

FIG. 6 provides a test case details interface 600 useful for summarizing test case details of a current test set in table format. The test case details interface 600 may be presented in a read-only mode to summarize the details on the test case interface. Each row represents a single method. This table helps to analyze the test case by displaying a number of method execution statuses with different field values, including "Method Name 610, Log Message 612, Method Alias Name 614, IF Condition Name 616, Result of IF Condition 618." Other fields which may be shown in this interface include Abort Test Case Flag, Variable Name, Element Name, Variable Value, Expected Result and Actual Result. Each of these values are the same as the ones defined at the time of test case creation. This table may also be configured to display rows with different colors, such as providing colors Green, Red and Gray to indicate PASS, FAIL and NORUN statuses, respectively.

Figure 7:
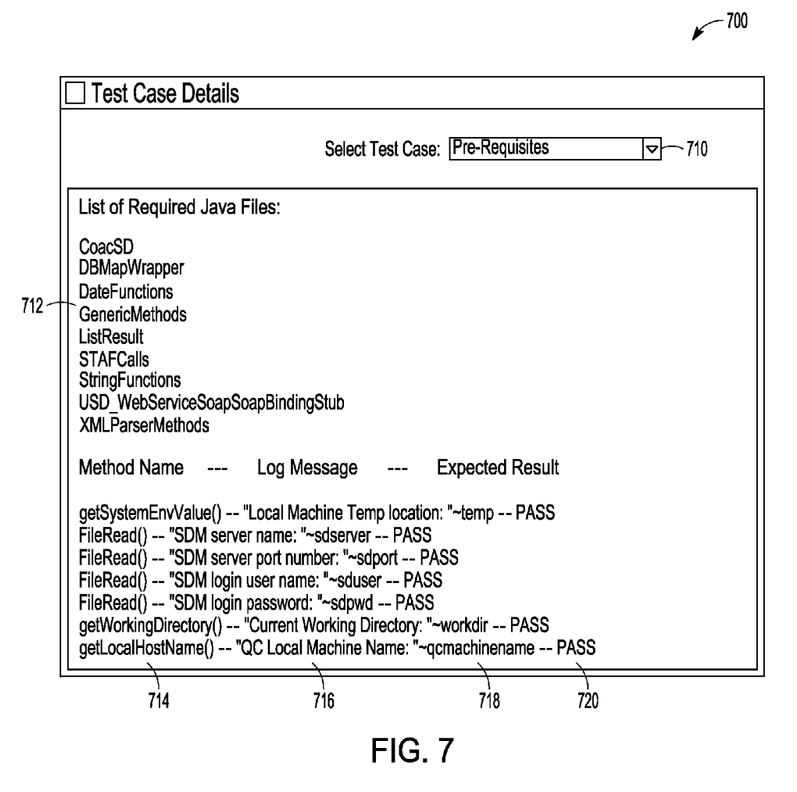
FIG. 7 is an illustration of a graphical user interface for viewing a list of programs and methods required for execution of an automated test case in a test case automation tool, according to an example embodiment.

FIG. 7 provides another embodiment of a user interface window 700 configured to provide test case details for a selected test case 710 (depicted in FIG. 7 as the "Pre-Requisites" test case). The information provided by window 700 may be useful when copied directly into a testing or quality control application. As illustrated, the information may include a list of testing software application files 712 to perform the test and details on specific method executions in the test case of a software application. This may include the method name 714, any logging or status message 716 provided during execution of the method, variable values 718 to be logged after execution of the method, and an expected result 720 of the method execution.

In a further embodiment, the test case automation tool also provides a series of interfaces to consume web services and select methods of the web service for inclusion in test cases and test sets. For example, the test case automation tool may expose methods of a web service for testing. The test case automation tool may include a GUI to accept login and address parameters for a web service, and use of the appropriate input will create a test set based on WSDL (web service definition language) definitions of the various web service methods. If the given login information is invalid or web services are not running properly, then a message box may be displayed with a proper message.

Figure 8:
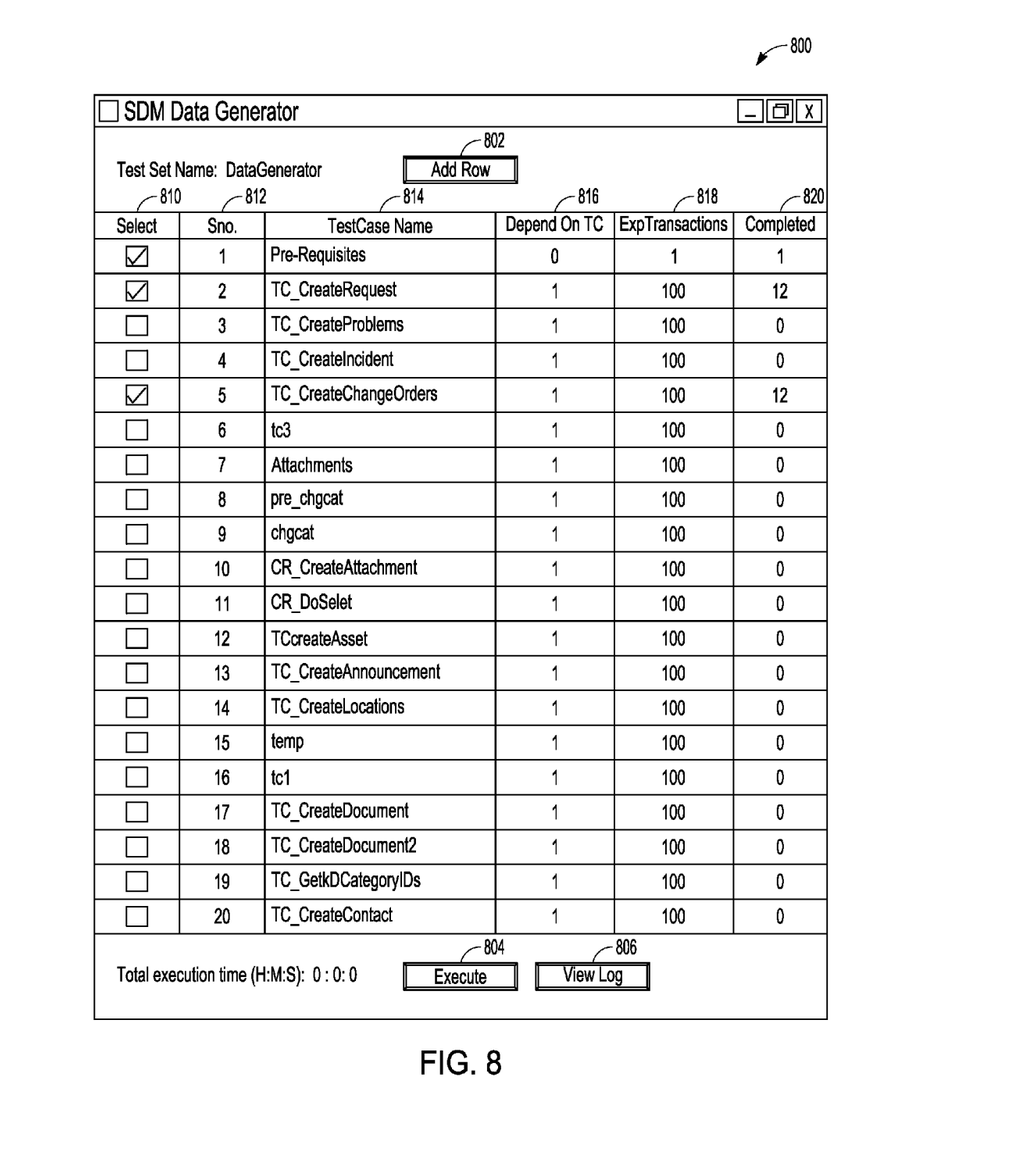
FIG. 8 is an illustration of a graphical user interface for performing a series of automated test case executions using test cases produced by a test case automation tool, according to an example embodiment.

In one embodiment, test cases produced by the presently described test case automation tool may be combined and automated in various combinations with each other. FIG. 8 provides an illustration of a test set data generator graphical user interface 800, which may be embodied in an integrated or standalone software program to generate test data and execute test cases in parallel. One use of the test set data generator GUI 800 is to generate a large number of test set records in a database or other data store for testing purposes, and execute these records as instructed. For example, the test set data generator GUI 800 may provide an ability to add a test case 802 to its listing. The test set data generator GUI 800 may also provide an ability to directly execute selected test cases 804, and view logging information 806 for the selected test case execution.

The example test set data generator GUI 800 provides a selection interface 810 and ordering 812 to enable a plurality of test cases 814 to be executed in proper order. The test set data generator GUI 800 may also provide an indication of test case dependencies 816 and an expected number of actions or transactions 818. The test set data generator GUI 800 may further provide an indication of completed test case operations 820 during execution.

Test cases designed by the presently described test case automation tool may be designed to encompass any range of unit testing (i.e., the testing of individual methods of a software application). The test case development may also provide comprehensive application testing (i.e., testing all methods of a software application and various user interfaces and services (such as website user interfaces and web services) that consume many or all of the methods of the software application). Results produced by the test case automation tool for both unit testing and application testing may be provided directly within the test case automation tool user interface, provided in a series of reports produced by the automation tool, or provided to one or more third party tools and utilities.

Some of the advantages of the presently described automation techniques and tools may include, but are not limited to, the benefits of test case automation without associated test script development. For example, the presently described techniques and configurations may provide reduced cost in the generation and maintenance of test cases and test suites. This may occur because user knowledge of scripting or programming languages is not required. Due to low cost automation and fewer skill requirements, automation coverage may be higher than with test scripting language solutions.

The presently described GUIs may be configured in a variety of fashions, including enabling execution without installation or any special computer system configurations. The test case automation tool therefore is extensible and customizable. Likewise, the test case automation tool may implement internationalization (I18N) and localization (L10N) testing, or like testing strategies and requirements, through either built-in functionality or third-party add-ins. These strategies may produce high productivity in terms of automated test-cases and test-coverage.

These example advantages are merely provided as illustrations of the capabilities of the presently disclosed embodiments, and are not intended to provide limitations on the scope of the invention. Specifically, a test case automation tool within the scope of the present invention may not include each of the aforementioned advantages and features, or alternately may contain additional or substitute advantages and features. Likewise, the user interfaces illustrated and described above are provided as only one example of an implementation for a test case automation tool, as a variety of modifications may be made to an interface within the scope of the various embodiments described herein.

Figure 9:
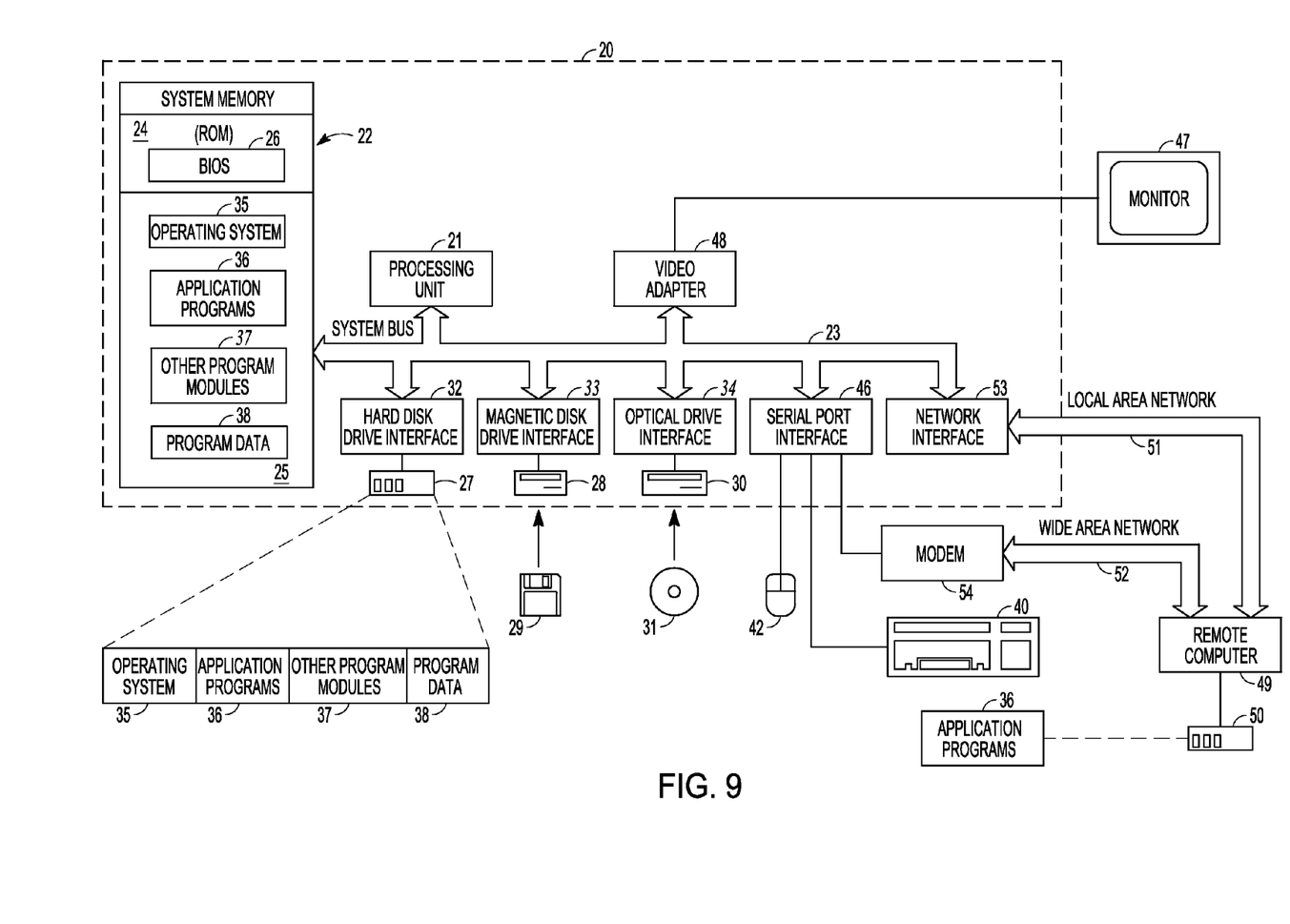
FIG. 9 is a block diagram illustrating a computer system for operating a test case automation tool, according to an example embodiment.

FIG. 9 provides an overview diagram of a suitable computer hardware and computing environment in conjunction with which various embodiments may be practiced. The description of FIG. 9 is intended to provide a brief, general description in conjunction with which the invention may be implemented. In some embodiments, the invention is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 9, a hardware and operating environment is provided that is applicable to the various software applications and tools described in the other figures and described above. It can be appreciated that the following hardware and operating environment might be used in connection with the development of the software application to be tested, the use and operation of the test case automation tool, the use and operation of integrated third party test tools, or the deployment of the software application to be tested.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 9, a hardware and operating environment is provided that is applicable to any of the servers and/or remote clients shown in the other figures. As shown in FIG. 9, one embodiment of the hardware and operating environment includes a general purpose computing device in the form of a computer 20 (e.g., a personal computer, workstation, or server), including one or more processing units 21, a system memory 22, and a system bus 23, that operatively couples various system components, including the system memory 22 to the processing unit 21. There may be only one or more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory 22 can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. Programming for implementing one or more processes or methods described herein may be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a GUI for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to the computer 20, or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the Internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device), or any other type of communications device (e.g., a wireless transceiver), for establishing communications over the WAN 52, such as the internet. The modem 54, which may be internal or external, is connected to the system bus 23 via the serial port interface 46. In a networked environment, program modules depicted relative to the computer 20 can be stored in the remote memory storage device 50 of remote computer/server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method, and machine readable medium for creating and performing automated functionality test cases have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The previous text, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer implemented method, comprising:
   communicating, between a test case automation tool and a software application, to extract a list of methods to test from the software application;
   storing the list of methods in a first extensible markup language (XML) file;
   defining a first automated test case in a second XML file for testing the software application, the defining including:
   receiving selection input of a set of methods from the list of methods in the first XML file and indicating in the second XML file the set of methods;
   receiving parameter values for parameter fields for the set of methods to use in a test case execution and indicating in the second XML file the parameter fields and the selected parameter values;
   indicating in the second XML file a specified order of execution of the set of methods, wherein the specified order of execution of the set of methods comprises an order that is different than an order of the set of methods in the software application;
   indicating in the second XML file a list of files required for the set of methods; and
   in response to indication of the first automated test case, reading the second XML file and executing the set of methods indicated in the second XML file according to the specified order in the second XML file and with the selected parameter values in the second XML file.

2. The computer implemented method of claim 1, further comprising abstracting a first of the parameter values to a parameter type for execution of a first method of the set of methods.

3. The computer implemented method of claim 1, further comprising:
   outputting results from execution of the first automated test case including:
   a pass status for a method of the set of methods when a result from execution of one of the set of methods matches an expected result; and
   a fail status when a result from execution of the one of the set of methods does not match the expected result.

4. The computer implemented method of claim 3, wherein outputting results from execution of the first automated test case further includes outputting at least one of:

expected and actual results from execution of the set of methods;

a pass or fail status from execution of the set of methods;

a stack trace for debugging execution of any one of the set of methods and the first automated test case; and test data generated from reading the first automated test case defined in the second XML, file.

5. The computer implemented method of claim 1, further comprising:

receiving input defining a plurality of automated tests cases, including the first automated test case, as an automated test set in a third XML, file; and indicating dependencies among the plurality of automated test cases as parameter values in the third XML file.

6. A non-transitory machine readable storage medium, comprising instructions for automated test case generation stored thereon, the instructions to:

communicate with a software application to extract a list of methods to test from the software application;

store the list of methods in a first extensible markup language (XML) file;

define a first automated test case in a second XML file for testing the software application, wherein the instructions to define include instructions to:

receive selection input of a set of methods from the list of methods in the first XML file and indicate the set of methods in the second XML file;

receive parameter values for parameter fields for the set of methods to use in a test case execution and indicate the parameter values and the parameter fields in the second XML file in association with corresponding ones of the set of methods;

indicate a specified order of execution of the set of methods in the second XML file, wherein the specified order of execution of the set of methods comprises an order that is different than an order of the set of methods in the software application;

indicate a list of files required for the set of methods in the second XML file; and in response to indication of the first automated test case, read the second XML file and execute the set of methods indicated in the second XML file according to the specified order in the second XML file and with the selected parameter values in the second XML file.

7. The non-transitory machine readable storage medium of claim 6 further comprising instructions to abstract the parameter values to parameter types for execution of a first method of the set of methods.

8. The non-transitory machine readable storage medium of claim 6 further comprising instructions to:

output results from execution of the first automated test case including:

a pass status for a method of the set of methods when a result from execution of the method matches an expected result for the method; and a fail status for a method of the set of methods when a result from execution of the method does not match the expected result for the method.

9. The non-transitory machine readable storage medium of claim 8, wherein the instructions to output results from execution of the first automated test case comprise instructions to output at least one of:

expected and actual results from execution of the set of methods;

a pass or fail status from execution of the set of methods;

a stack trace for debugging execution of any one of the set of methods and the first automated test case; and test data generated from reading of the first automated test case defined in the second XML file.

10. The non-transitory machine readable storage medium of claim 6 further comprising instructions to:

receive input defining a plurality of automated tests cases, including the first automated test case, as an automated test set in a third XML file:

indicate dependencies among the plurality of automated test cases as parameter values in the third XML file.

11. A computing system configured for automated test case definition and execution, the computing system comprising:

a processor;

a memory; and instructions stored in the memory and executable by the processor to cause the computing system to communicate with a software application to extract a list of methods to test from the software application;

store the list of methods in a first extensible markup language (XML) file;

define a first automated test case in a second XML file for testing the software application, wherein the instructions to define comprise instructions to:

receive selection input of a set of methods from the list of methods in the first XML file and indicate the set of methods in the second XML file;

receive parameter values for parameter fields for the set of methods to use in a test case execution and indicate the parameter values and the parameter fields in the second XML file in association with corresponding ones of the set of methods;

indicate a specified order of execution of the set of methods in the second XML file, wherein the specified order of execution of the set of methods comprises an order that is different than an order of the set of methods in the software application;

indicate a list of files required for the set of methods in the second XML file; and in response to indication of the first automated test case, read the second XML file and execute the set of methods indicated in the second XML file according to the specified order in the second XML file and with the selected parameter values in the second XML file.

* * * * *